Sept. 13, 1938.     C. C. CRUZAN     2,130,318
WIRE FORMING MACHINE AND METHOD
Filed Dec. 12, 1936     5 Sheets-Sheet 1

CHARLES C. CRUZAN
INVENTOR

BY
ATTORNEY

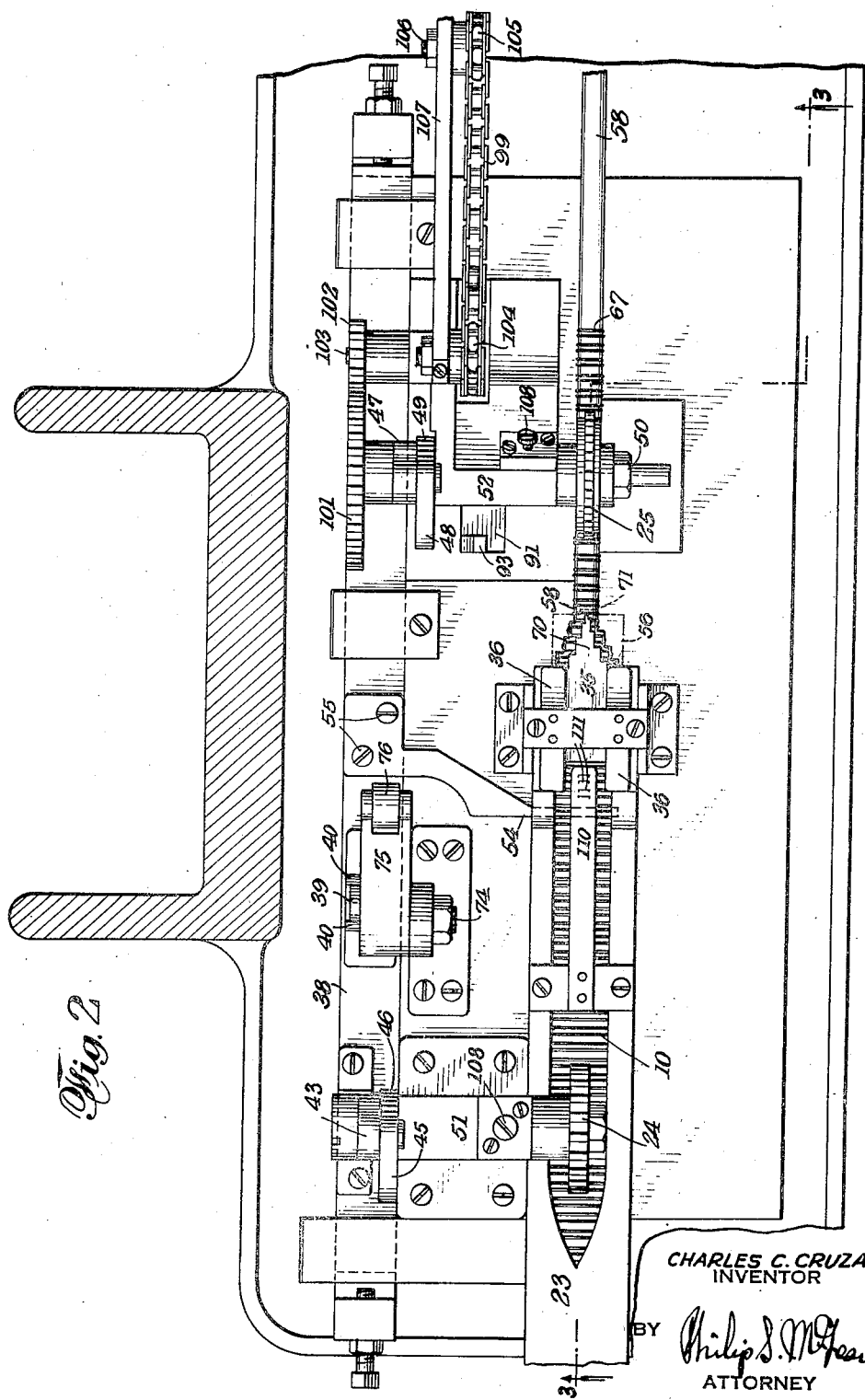

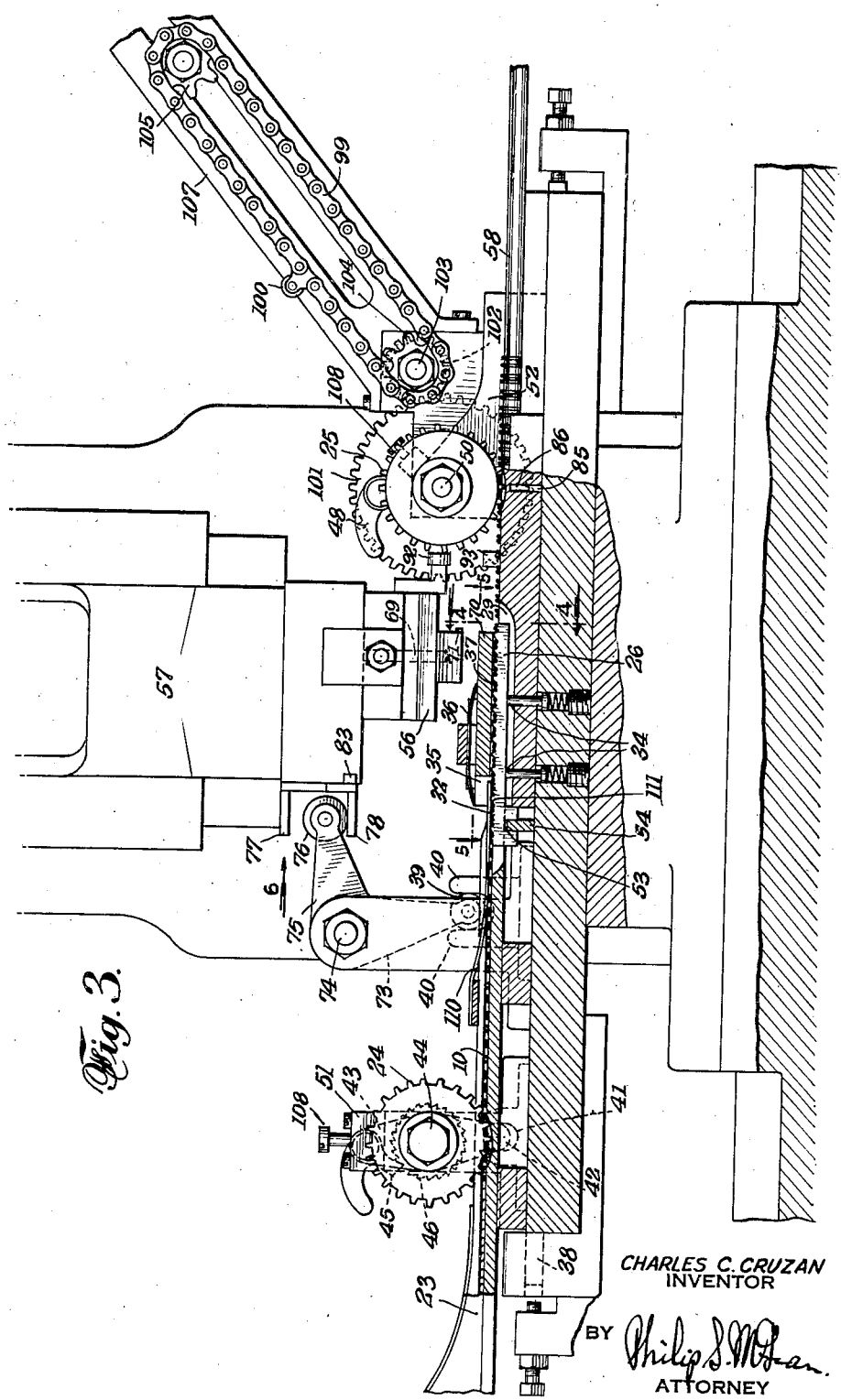

Sept. 13, 1938.    C. C. CRUZAN    2,130,318
WIRE FORMING MACHINE AND METHOD
Filed Dec. 12, 1936    5 Sheets-Sheet 4
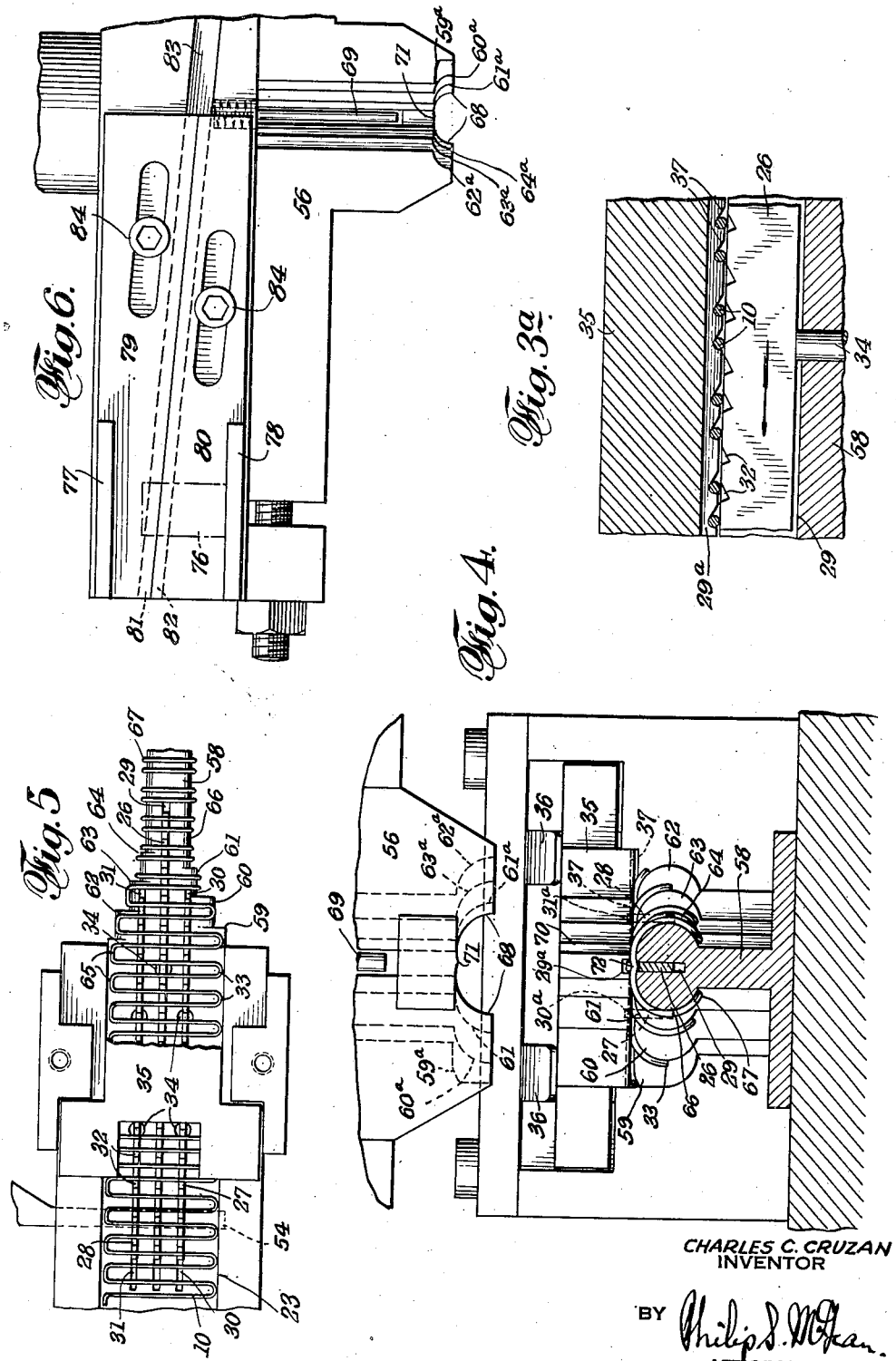
CHARLES C. CRUZAN
INVENTOR
BY
ATTORNEY

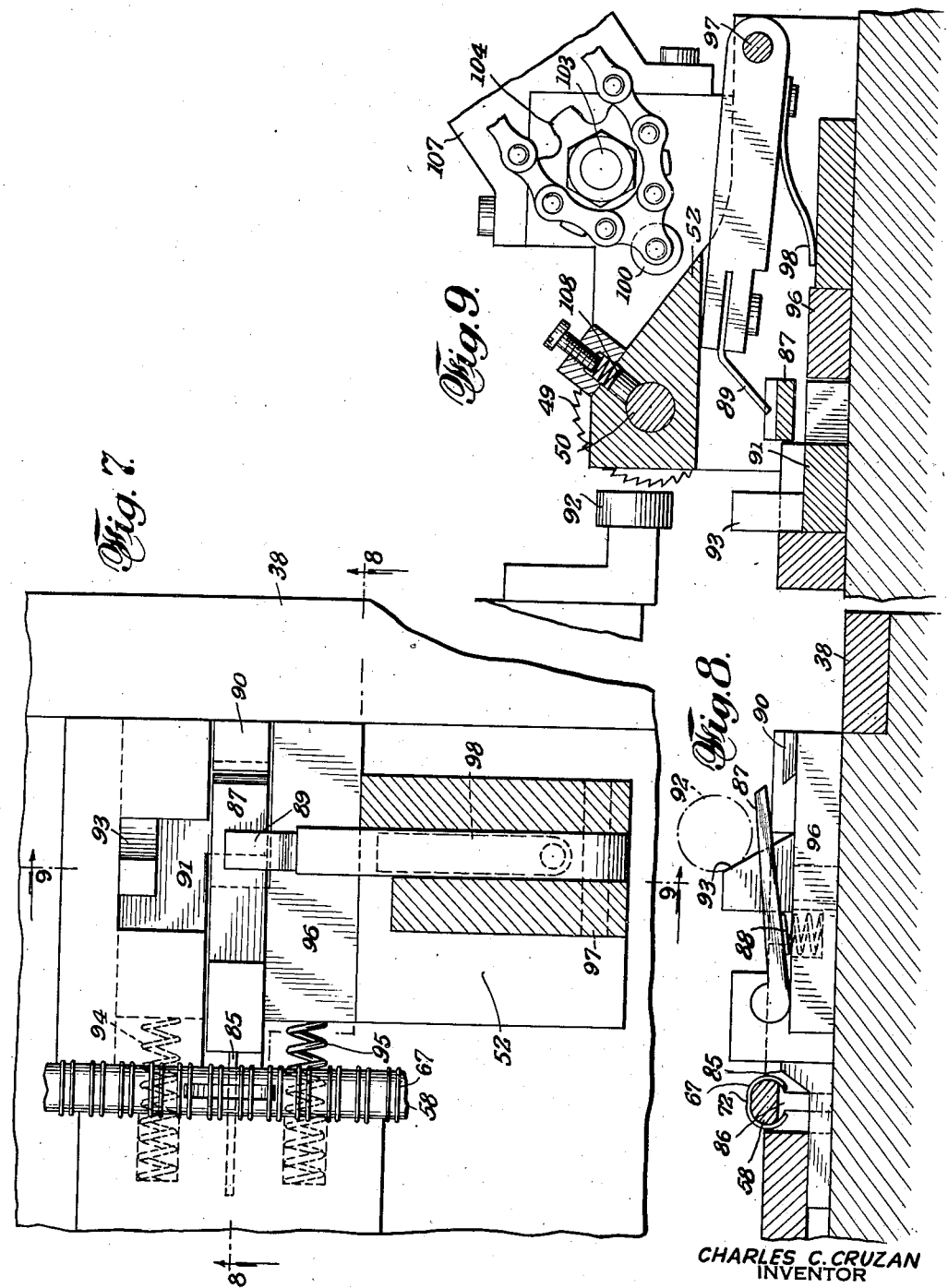

Patented Sept. 13, 1938

2,130,318

UNITED STATES PATENT OFFICE 2,130,318

WIRE FORMING MACHINE AND METHOD

Charles C. Cruzan, Poughkeepsie, N. Y., assignor to Trussell Manufacturing Company, Poughkeepsie, N. Y., a corporation of New York Application December 12, 1936, Serial No. 115,489

25 Claims. (Cl. 140—71)

This invention relates to wire forming, generally, but more particularly to the manufacture of binders made up of wire which is bent into zigzag shape to form spaced, connected ribs or prongs and then bent transversely to shape such prongs into open rings ready to receive the material to be bound.

The usual practice has been to form the zigzag strip, to cut that in the lengths required for different binders and then to transversely bend these flat cut lengths into the partly completed ring form ready to receive the material for binding. In cases where the binding elements were not immediately required, the flat strip coming from the zigzag machine has been wound in coils ready to be subsequently cut and shaped to ring form.

Such methods involve considerable handling and require careful packing of the partly completed binder elements.

Objects of this invention are to avoid as much as possible the objections and difficulties of present methods, such as outlined, and to accomplish the change from the flat strip to the ring constituting shape as a more or less continuous operation.

Other related objects are to enable the binder material being formed from the flat zigzag strip directly into partly closed ring shape and to then be stored in continuously lengths of the partly closed rings, which may be cut at any time in any desired binder lengths.

Further objects are to provide simple, practical and efficient mechanism for accomplishing the results mentioned and which may be readily adapted to present machines and equipment.

Other desirable objects and the many novel features of the invention are set forth or will appear in the course of the following specification.

The drawings accompanying and forming part of the specification illustrate a desirable and at present preferred embodiment of machine involving the invention, but the structure may be modified and changed as regards this particular disclosure, all within the true intent and broad scope of the invention.

Figure 2 is an enlarged broken horizontal sectional view as on substantially the plane of line 2—2 of Figure 1.

Figure 3 is a broken vertical sectional view taken on substantially the plane of line 3—3 of Figure 2.

Figure 3a is an enlarged broken sectional detail of one of the feed bars and cooperating hold down.

Figure 4 is a further enlarged broken cross sectional detail of the upper and lower die mechanism, as on line 4—4 of Figure 3.

Figure 5 is an enlarged broken partial plan view as on substantially the plane of line 5—5 of Figure 3.

Figure 6 is a broken detail of the upper die structure viewed in the direction of the arrow 6 of Figure 3.

Figure 7 is a broken sectional view of the cut-off mechanism taken on substantially the plane of line 7—7 of Figure 1.

Figure 1:
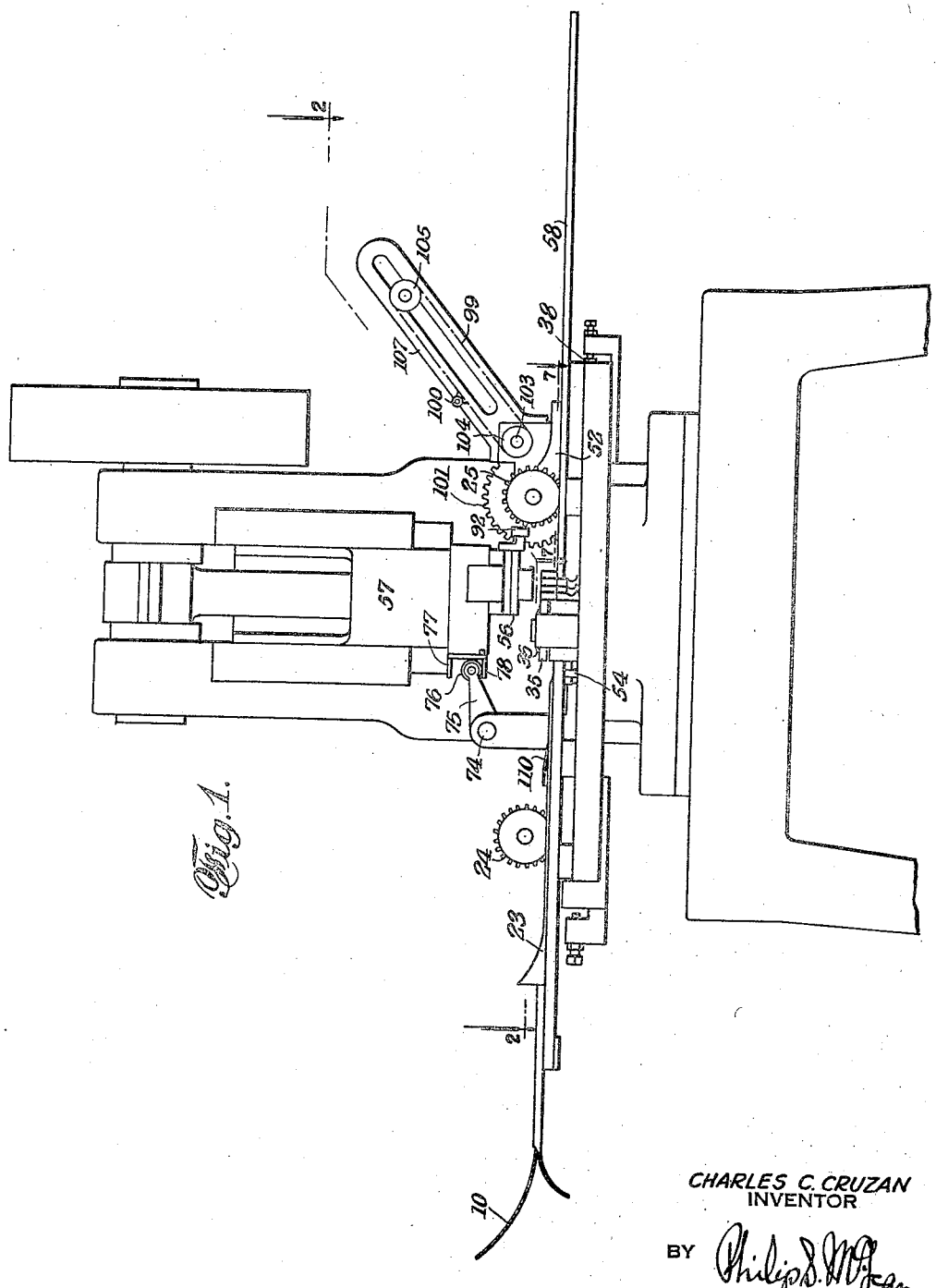
Figure 1 is a broken side elevation of the machine, shown as operating on flat zigzag stock coming from a zigzag forming machine or from a reel holding a supply of such material.

Figures 8 and 9 are broken vertical sectional details taken on substantially the lines 8—8 and 9—9 of Figure 7.

In the general view, Figure 1, the flat zigzag strip stock is indicated at 10 coming from a supply reel or directly from a zigzag forming machine or from other source, such stock being supplied to the machine as required, without straining or stretching the zigzag material.

Entering the machine, the strip stock passes into a horizontal guideway 23 through which it is advanced step by step by a feed wheel 24, having relatively wide faced teeth, Figure 2, entering the spaces between the adjoining ribs of the strip and a second feed wheel 25 in an advanced position having narrower teeth similarly entering the spaces between the ribs, which at this advanced station have been bent into the open ring form.

The strip material is additionally controlled and fed, in the field of bending operations between feed wheels 24 and 25, Figures 2, 3, 4 and 5, by an intermediate and two side feed bars, 26 and 27, 28, sliding in guide slots 29 and 30, 31 and ratchet toothed as indicated at 32 in Figures 3, 3a and 5, to enter between and accurately engage and feed the double strand ribs or prongs 33 of the strip. These feed bars or slides are yieldingly pressed upwardly by spring plungers 34, Figures 3, 3a, against a hold down plate 35, yieldingly depressed by springs 36 and cross slotted at 37 to form reversely faced ratchet teeth receiving the cross strands or prongs of the stock and holding same in the advanced position, during return stroke of the feed bars.

In Figures 3a and 4 the hold down shoe 35 is shown grooved at 29a, 30a, 31a, in line with grooves 29, 30, 31, to receive the feed bars in their reciprocating and up and down movements in advancing the stock step by step.

The two feed wheels 24, 25 and the three feed bars 26, 27, 28 are simultaneously actuated from a common feed slide designated 38 and reciprocated by a roll 39 entered in a pocket provided between upstanding lugs 40 on the slide, Figures 2 and 3. This slide has a similar pocket 41 receiving a roll 42 on the lower end of a lever 43 pivoted on the same center as the shaft 44 which carries the feed roll 24, said lever carrying a spring pressed pawl 45 engaging a ratchet 46 on the feed roll shaft.

The second feed wheel 25 is similarly operated from the slide through a rock lever 47, carrying a spring pawl 48 engaging ratchet wheel 49 on the shaft 50 of feed wheel 25. The feed wheel shafts 44 and 50 are journaled in bearings provided by brackets 51, 52 stationary on the table or base portion of the machine.

The three feed bars 26, 27, 28 are provided with cross slots as indicated at 53, Figure 3, to receive a cross key or lug 54 secured on the feed slide 38 at 55, Figure 2.

Thus, with each forward movement of the feed slide 38, the two feed wheels 24, 25 and the three feed bars 26, 27, 28 will be advanced a similar extent to accurately hold and advance the zigzag strip stock.

The shaping and forming is effected progressively by a stepped die 56 carried by the ram 57, cooperating with the lower die or anvil 58.

The anvil 58 as particularly shown in Figure 5, forms in effect a continuation of the bed of the strip guide 23 and is shown as having offset downwardly curved steps at opposite sides over which the prongs and the connecting portions of the zigzag strip are progressively brought down to the desired open ring formation.

This bending is accomplished in four successive stages. Thus, for the prong ends, there are three successively deeper steps 59, 60, 61, for the prong tips 33 and three successively lower curved steps 62, 63, 64, for the connecting portions 65 between adjoining prongs. The final curvature of the anvil at 66, immediately adjoining the last two steps 61, 64, as shown in Figure 4, is approximately that of the desired partly closed ring shape 67. The complementary upper die 56 has correspondingly shaped faces 59a, 60a, 61a, for cooperation with the prong bending steps 59, 60, 61, correspondingly offset concavely curved faces 62a, 63a, 64a, cooperative with the back bending faces 62, 63, 64, and final bending surfaces 68, cooperative with the final bend contour 66 of the anvil. In addition, the upper movable die member carries a spring plunger 69 to engage and yieldingly force the presser plate 35 down over the positioned stock.

It will be noted in Figures 4 and 6 that the bending steps or shoulders of the anvil and cooperating faces of the plunger, constituting the bending dies, are of substantially the same curvature but located successively closer together so that at each stroke the tips of the prongs and the back connections will be brought successively closer together. Thus, both the tips and the base ends of the ribs are first bent to the proper curvature and then inner portions of both ends of the prongs are successively bent to progressively bring the curved ends closer together. In this manner the rings are gradually closed or brought to more nearly closed relation without the need of undercut dies or other complicated die formations.

The hold down plate 35 is shown in Figure 2 as reduced in width and correspondingly stepped at 70 where it extends over the stepped portion of the lower die member to hold down the work and leave space at opposite sides of the same for the bending surfaces of the upper die member.

To provide a hinge point where the ring elements of the binder will bend on closing to the final ring form, the upper die is shown in Figure 4 as carrying a creasing point 71 which will form a crease or indentation 72 in the back or top intermediate portion of the ring. This creasing point, it will be noted, comes opposite the yieldably supported center feed bar 26 in the slot 29, which enables the ring material to yield downwardly under this creasing action.

Necessary co-relation between die plunger and feed slide is effected in the construction shown by having the plunger operate the roll 39 through which reciprocation is imparted to the feed slide. As shown in Figure 3, roll 39 is carried by one arm 73 of a bellcrank operating on center 74, the other arm 75 of which carries a roller 76 positioned between flanges 77, 78 on the side of the plunger. As indicated in Figure 6, these flanges are relatively and both together adjustable by being carried by slides 79, 80 having tongues 81, 82 engaged in an inclined way 83 in the side of the plunger and held in desired adjustments by securing screws 84. Upon loosening one or the other or both of these screws, the plates 79, 80 may be shifted to widen or narrow the space between the roller actuating flanges 77, 78, or to bodily raise or lower both these flanges in respect to the plunger. Thus the stroke of the feed slide may be regulated to compensate for wear in the mechanism or irregularities in the zigzag stock or to effect proper timing.

The lower die or anvil is shown in Figures 1, 2 and 3 as extended some distance beyond the actual forming portion to serve as a guide rail over which the stock will smoothly advance and, if the finished stock is to be wound in reels or the like, this guide rail may be extended into near proximity to the reel or other stock gathering or accumulating device.

In the machine here shown the formed stock is automatically cut in predetermined lengths by a sliding knife 85, Figures 7 and 8, operating through a cutoff slot 86 in the stock guiding rail or extension of the anvil 58 and actuated by a pivoted push link 87, Figure 8, which can be depressed against the tension of a supporting spring 88 by a push down finger 89, Figure 9, so that the free end of said push link will be in line with and engaged by an undercut catch lug 90 on the slide 91. This slide is projected by engagement of a roll 92 on the plunger with an upwardly extended inclined cam shoulder 93 on the slide and return movement of the slide is effected by a spring 94, Figure 7. Thus the cutoff actuating slide is reciprocated for each reciprocation of the plunger. The actual operation of the cutter, however, is dependent upon the positioning of the push link 87 in front of the abutment 90 on the slide. The return of the cutoff knife is effected by spring 95 shown in Figure 7 as acting against a base extension 96 of the cutter blade.

The positioning finger 89 which determines the operativeness of the cutter is shown in Figure 9 as a lever pivoted at 97 and yieldingly supported in an upper position by spring 98. Running over the top of this positioning finger is a sprocket chain 99 carrying one or more rollers 100 adapted to engage and depress the finger to cause the same to force the push link 87, Figure 8, down into the plane of abutment 90 on reciprocating slide 91. This control chain is shown as driven in time with the feed wheel 25 by a gear 101 on the feed wheel shaft 50 engaging a pinion 102 on the shaft 103 which carries the lower sprocket 104 for this chain. The upper sprocket 105 is indicated in Figure 2 as adjustably secured at 106 in a slotted bracket 107 so that chains of different lengths and with different numbers or spacing of control rollers 100 may be readily substituted.

To control the feed wheels 24, 25 and prevent any overrunning movements of same, the shafts 44 and 50 carrying these wheels may be acted upon by adjustable frictional spring brakes such as shown at 108, Figure 9, and represented by these same numerals in Figures 2 and 3.

The stock is advanced through the machine in a way to prevent opening up or distortion of the loops, by the two feed wheels 24 and 25, located at opposite sides of the punch and by the three feed bars 26, 27, 28 and cooperating hold down plate 35, for advancing, guiding and holding the stock in the region of the bending dies. The toothed feed bars and reversely toothed hold down, advance and hold the strands of the stock in parallelism, right up to the moment of bending. The two side bars 27 and 28 are shown as extending up into the stepped portion of the lower die or anvil and the intermediate feed bar 26 as extending up into the guide rail portion of the anvil, actually beyond the last bending stage. The toothed positioning and holding plate 35 is shown as extending fully beneath and beyond the dies. With this absolute control of the stock the machine may be operated at high speed and produce a uniform high grade product.

While the E shape form of partly closed ring, as shown in Figure 4, is desirable, it will be appreciated that the final shape of ring formed on the machine may be varied as required. The creasing has the desirable effect of slightly spreading and thereby releasing the formed material of any grip on the anvil or mandrel, enabling it to feed smoothly away from the dies. The second feed wheel 25 takes the product away as fast as it is finished.

In Figures 2 and 3 a yielding spring hold down finger is shown at 110 having a toothed portion 111 overstanding and yieldingly engaging the strands of the stock at a point above the feed bars 26, 27, 28, and just behind the yielding hold down plate 35. This construction and relation also aids in the proper feeding of the material.

In the present illustration the completed stock is automatically severed in predetermined lengths and may be discharged in such lengths into containers located to receive the same. If desired, however, the formed stock may be kept in continuous lengths, as by winding the same in loose coils and then be severed in desired lengths at any subsequent time. The machine shown may be readily combined with existing equipment. Thus, for example, it may be associated with the zigzag forming machine so as to take the strip directly as it is originally formed. By continuously forming the zigzag strip directly from the flat to the ring shape, much time and handling is saved and additional time is saved and desired accuracy is maintained by automatically cutting the binding ring material right on the guide rail extension of the die on which it is shaped.

The teeth 32 of the reciprocating feed bars 26, 27, 28 are shown in Figures 3 and 5 as ratchet teeth with the abrupt shoulders of the same forwardly in the direction of stock advance so that in the forward stroke, the feed bars will positively advance the wire strip a definite amount and so that on the return stroke, these bars can slip back under the stock for a fresh hold. The teeth or notches 37 in the under face of the hold down plate 35 are shown as reversely faced ratchet teeth; that is, with the abrupt shoulders of the same at the back, toward the left in Figure 3, so as to prevent retrograde movement and to hold the strands in place in their advanced relation while the feed bars are retreating to take the next hold on the stock. By this combination of reversely faced teeth on feed bars and hold down, the bars operate to feed the stock forward and leave the same located in the notches in the hold down and the latter serves to hold the stock so positioned while the forming dies are operating and while the feed bars slip back to take hold for the next advance. The ratchet teeth of the feed bars are of further advantage in holding the strands in parallelism as they are bent in successive steps, starting at the outer or free ends at the edges of the strip and working inward toward the center, Figures 4 and 5.

It is realized that many changes may be made, within the broad intent and scope of the invention. Terms employed herein have, therefore, been used in a descriptive, rather than in a limiting sense, except as possible limitations may be imposed by state of the prior art.

What I claim is:

1. A machine for forming the strands of a zigzag wire strip into ring shape comprising a guide for flat zigzag wire strip, a die having stepped bending surfaces at the end of said guide, a companion die having cooperating stepped bending surfaces opposed to those of the first die, means for effecting cooperative action of said dies and means for effecting advancement of zigzag wire strip through said guide to said cooperating dies, including feed devices toothed to engage the strands of said zigzag wire strip and located at opposite sides of said cooperating dies to thereby engage and position the strands of the zigzag strip both before and after the forming operations of the dies.

2. A machine for forming the strands of a zigzag wire strip into ring shape comprising a guide for flat zigzag wire strip, a die having stepped bending surfaces at the end of said guide, a companion die having cooperating stepped bending surfaces opposed to those of the first die, means for effecting cooperative action of said dies, means for effecting advancement of zigzag wire strip through said guide to said cooperating dies, including a movable feed member toothed to engage the strands of a zigzag wire strip and a yielding hold down plate between said dies and stepped accordingly to hold the stock in place closely adjacent the stepped bending surfaces, said hold-down plate being recessed to receive and hold the strands of the strips advanced by said toothed feed device.

3. A machine for forming the strands of a zigzag wire strip into ring shape comprising a guide for flat zigzag wire strip, a die having stepped bending surfaces at the end of said guide, a companion die having cooperating stepped bending surfaces opposed to those of the first die, means for effecting cooperative action of said dies and means for effecting advancement of zigzag wire strip through said guide to said cooperating dies, including reciprocating feed bars operating in said guide and the die at the end of the same and toothed to engage the strands of the zigzag strip.

4. A machine for forming the strands of a zigzag wire strip into ring shape comprising a guide for flat zigzag wire strip, a die having stepped bending surfaces at the end of said guide, a companion die having cooperating stepped bending surfaces opposed to those of the first die, means for effecting cooperative action of said dies, means for effecting advancement of zigzag wire strip through said guide to said cooperating dies, including reciprocating feed bars operating in said guide and the die at the end of the same and toothed to engage the strands of the zigzag strip and a hold down plate above said feed bars and recessed to receive the strands of said strip.

5. A machine for forming the strands of a zigzag wire strip into ring shape comprising a guide for flat zigzag wire strip, a die having stepped bending surfaces at the end of said guide, a companion die having cooperating stepped bending surfaces opposed to those of the first die, means for effecting cooperative action of said dies and means for effecting advancement of zigzag wire strip through said guide to said cooperating dies, including a feed wheel toothed to engage the strands of said zigzag wire strip.

6. A machine for forming the strands of a zigzag wire strip into ring shape comprising a guide for flat zigzag wire strip, a die having stepped bending surfaces at the end of said guide, a companion die having cooperating stepped bending surfaces opposed to those of the first die, means for effecting cooperative action of said dies and means for effecting advancement of zigzag wire strip through said guide to said cooperating dies, including feed wheels at opposite sides of said cooperating dies and toothed to engage the strands of the zigzag strip before and after the forming operations.

7. A machine for forming the strands of zigzag wire strip into ring shape comprising an anvil having stepped bending surfaces for the opposite edge portions of the wire strip and spaced successively closer together, a cooperating die having correspondingly spaced stepped bending surfaces for cooperation with the stepped bending surfaces of the anvil, means for effecting relative approach and separation of the die and anvil and means for intermittently advancing zigzag wire strip between said cooperating die and anvil, including movable feed devices at the opposite faces of the zigzag wire strip and toothed to reversely engage individual strands of said zigzag strip from opposite sides of the same.

8. A machine for forming flat strip stock transversely into ring shape comprising cooperating dies stepped to progressively transversely bend the stock into desired ring conformation, a guide for directing the flat strip stock to said dies, a rail forming an extension of and projecting a considerable distance away from one of the dies and about which the formed ring shaped stock is guided and directed an appreciable distance away from said dies and feed means for advancing the flat strip stock through the guide to the dies and for advancing a length of the formed strip over said rail away from the dies.

9. A machine for forming flat strip stock transversely into ring shape comprising cooperating dies stepped to progressively transversely bend the stock into desired ring conformation, a guide for directing the flat strip stock to said dies, a rail forming an extension of and projecting a considerable distance away from one of the dies and about which the formed ring shaped stock is guided and directed an appreciable distance away from said dies, feed means for advancing the flat strip stock through the guide to the dies and for advancing a length of the formed strip over said rail away from the dies and a cutoff slide cooperating with said rail to effect severance of the formed strip material.

10. A machine for forming flat strip stock transversely into ring shape comprising cooperating dies stepped to progressively transversely bend the stock into desired ring conformation, a guide for directing the flat strip stock to said dies, a rail forming an extension of and projecting a considerable distance away from one of the dies and about which the formed ring shaped stock is guided and directed an appreciable distance away from said dies, feed means for advancing the flat strip stock through the guide to the dies and for advancing a length of the formed strip over said rail away from the dies and controllable means for automatically severing the formed stock on the rail in different selected predetermined lengths.

11. A forming machine of the character disclosed comprising an anvil having a rounded head portion with an intermediate recess, a resiliently supported feed bar operating in said recess and a companion die cooperating with said head portion to bend stock thereabout and having a creasing ridge in line with said recess for creasing the stock over said resiliently supported feed bar.

12. A machine of the character disclosed comprising a stepped reducing die and a companion die having correspondingly stepped cooperating surfaces, a reciprocating feed bar operating in the intermediate portion of said first die and feed bars operating in the stepped portions of said first die at opposite sides of said first feed bar.

13. In combination, a reciprocating punch head, a bending die carried thereby, a companion relatively stationary bending die, a guide for approaching strip stock between said bending dies, a slide operating in the general plane of said guide, operating connections from said punch head to said slide, reciprocating feed bars operating in said guide and actuated by said slide and rotary feed devices operated by said slide at opposite sides of said dies.

14. In a machine for operating on zigzag wire stock, a guide for zigzag wire strip stock, reciprocating feed bars operating in said stock guide and having ratchet teeth to engage the wire strands of the stock, arranged with the abrupt shoulders of said ratchet teeth forwardly in the direction of feed and a hold down over the stock guide having reversely faced ratchet teeth with the abrupt shoulders of the same rearwardly of the direction of feed, to receive the strands advanced by the feed bars and to then hold such strands in advanced position while the reciprocating feed bars retreat to take fresh hold on the stock.

15. In a machine for operating on zigzag wire stock, a guide for zigzag wire strip stock, reciprocating feed bars operating in said stock guide and having ratchet teeth to engage the wire strands of the stock, arranged with the abrupt shoulders of said ratchet teeth forwardly in the direction of feed, a hold down over the stock guide having reversely faced ratchet teeth with the abrupt shoulders of the same rearwardly of the direction of feed, to receive the strands advanced by the feed bars and to then hold such strands in advanced position while the reciprocating feed bars retreat to take fresh hold on the stock and means for mounting said feed bars and hold down in resiliently cooperating relation separable to admit advance of the stock and return movement of the feed bars.

16. In a machine of the character disclosed, the combination of cooperating forming dies for transversely bending strip stock into ring-like conformation, means for intermittently effecting cooperative action of said dies, a knife for severing the formed stock, a reciprocating slide, a displaceable operating connection between said reciprocating slide and knife and timing means operating in synchronism with said dies after a predetermined succession of operations of said dies for positioning said operating connection to effect actuation of said cutting knife from said reciprocating slide.

17. In a machine of the character disclosed, a guide passage for enclosing and directing strip stock, cooperating bending dies at the end of said passage for transversely bending the stock issuing from said guide, one of said dies being in the form of a rail with a rounded head portion about which the stock is bent and extending as a guide rail away from the cooperating bending dies for a considerable distance and thereby serving to hold and guide a continuous length of the formed stock.

18. The method of forming a ring binder element which comprises intermittently advancing a flat zigzag wire strip over the head of a guide rail and progressively bending the edge portions of said zigzag strip into approximate ring shape engaged beneath the head of said rail and severing predetermined formed lengths of said binder material on said guide rail.

19. In a machine of the character disclosed, a guide for strip stock and opposed holding and feeding means for stock in said guide, including a reciprocating feed bar operating in said guide and toothed to engage and positively advance strands of zigzag wire strip stock on movement in a forward direction and to disengage said strands on movement in the reverse direction and an opposed member reversely toothed to permit forward movement of the wire strands advanced by the feed bar and to hold said strands in advanced position in the return movement of the feed bar.

20. A machine for forming a zigzag wire strip, including feed mechanism toothed to engage the strands of the zigzag wire strip and intermittently operating to positively advance the engaged strands of stock a uniform distance and intermittently operating forming dies for progressively shaping the advanced zigzag wire strands to ring-like form.

21. The method of progressively forming to ring conformation the strands of a zigzag shaped wire strip which comprises starting the forming operations at the loops connecting the adjacent strands of the strip and progressively bending the strands inwardly toward the intermediate portion of the zigzag strip.

22. In a machine for operation on zigzag wire stock, a guide for zigzag wire strip stock, a reciprocating feed member operating on the stock in the guide and having ratchet teeth to engage the wire strands of the stock and arranged with the abrupt shoulders of said ratchet teeth faced forwardly in the direction of feed and a hold-down member engaging the stock at the opposite side of the same from said feed member and having reversely faced ratchet teeth with the abrupt shoulder of the same faced rearwardly in the direction of feed to receive the strands advanced by the feed member to then hold such strands in advanced position while the reciprocating feed member retreats to take fresh hold on the stock.

23. In a machine of the character disclosed, a guide for strip stock and opposed holding and feeding means for stock in said guide, including a reciprocating feed member operating in said guide and toothed to engage and positively advance strands of zigzag wire stock in the guide on movement in a forward direction and to discharge and release said strands on movement in the reverse direction and an opposed member reversely toothed to permit said forward movement of the wire strands advanced by said feed member and to hold said strands in advanced position in the return movement of the feed member, said feed member and opposed holding member being relatively yieldable in respect to each other to enable advancing and holding action described.

24. In a machine of the character disclosed, cooperating stepped bending dies for progressively forming stranded wire strip stock into substantially C-shape, means for intermittently approaching and separating said stepped bending dies, means for intermittently feeding a strip of zigzag wire stock between said stepped bending dies and means carried by said bending dies for inwardly creasing the intermediate portion of said substantially C-shaped formed stock.

25. In a machine of the character disclosed, cooperating intermittently bending dies for forming stranded wire strip stock into substantially C-shape, with the ends of such stock separated to receive material to be bound and means for intermittently creasing the intermediate portion of said substantially C-shaped formed wire stock inwardly in the reverse direction into substantially E-shape form to locate a hinging point in the back of the stock and to further separate the ends of the stock.

CHARLES C. CRUZAN.